United States Patent [19]

Kelly et al.

[11] 3,959,588

[45] May 25, 1976

[54] DIGITAL LINE SYNCHRONIZER

[75] Inventors: Michael J. Kelly, Melrose Park; Satyan G. Pitroda, Villa Park, both of Ill.

[73] Assignee: GTE Automatic Electric Laboratories Incorporated, Northlake, Ill.

[22] Filed: May 5, 1975

[21] Appl. No.: 574,808

[52] U.S. Cl. .................. 178/69.5 R; 179/15 BS
[51] Int. Cl.² .................................. H04L 7/00
[58] Field of Search ............ 178/69.5 R; 179/15 BS; 340/347 DD; 328/55, 63; 325/13, 58

[56] References Cited
UNITED STATES PATENTS

| | | | |
|---|---|---|---|
| 3,829,843 | 8/1974 | Cichetti, Jr. .................. | 340/172.5 |
| 3,903,371 | 9/1975 | Colton et al. .................. | 179/15 BS |
| 3,906,484 | 9/1975 | Melvin, Jr. et al. ........... | 340/347 DD |

*Primary Examiner*—Benedict V. Safourek

[57] ABSTRACT

A digital line synchronizer system for use with a digital PCM TDM switching exchange will provide a vector address off-set between the address locations of WRITE and READ vectors within a multiple frame input buffer memory bank of the incoming line equipment upon the occurrence of either a loss of receive framing synchronization or the equalization of time reference between the WRITE and READ vectors with respect to the input buffer memory bank. The vector address off-set is provided to prevent the condition of information distortion due to the phenomenon of vector slippage whereby a given channel/word slot within the multiple frame memory bank is twice written with incoming PCM data under the operation of the WRITE vector address before the first stored sample of PCM data can be retrieved via the use of the READ vector address.

8 Claims, 9 Drawing Figures

DIGITAL LINE SYNCRONIZER

ADDRESS GATING LOGIC 55

FIG. 8

INPUT BUFFER MEMORY 57

FIG. 9

DIGITAL LINE SYNCHRONIZER

BACKGROUND

This invention relates generally to a digital line synchronizer comprising part of the incoming line equipment serving a synchronized PCM TDM digital switching exchange, and more particularly, relates to a novel synchronizer system useful to impart a predetermined off-set in memory positions between WRITE vectors and READ vectors.

A master PCM digital switching exchange may typically receive digital information pulse trains originating from a plurality of remote located channel bank equipment stations, respectively. The master switching exchange must then assemble a composite digital pulse train from the received terminal pulse trains so that the composite pulse train can be switched through the master switching exchange. It is popular to employ a master-slave syncrhonization method of obtaining synchronous operation of the transmission and reception of digital pulse information over the transmission loop between the master switching exchange and a selected terminal equipment station. Synchronous operation is provided through eliminating the independent derivation of clock timing signals in the transmit section of the distant terminal equipment and instead, slaving the reference timing of the transmit section thereof to the clock timing signals as generated in the master switching exchange and then reconstructed in the receive station of the remote terminal equipment. Such transmission loops are said to be frequency synchronized when the frequencies of the clock oscillators of the remote terminal stations are slaved (derived from) to the clock oscillator frequency within the master exchange. Moreover, as a particular type of frequency synchronization, when the overall propagation or transmission time delay is equal to an integral multiple of the frame period, the transmission loop is said to be frame synchronized. It is generally understood that frame synchronized transmission of PCM data is required in order to minimize the information storage required by input data buffer memory equipment provided at the master exchange.

The occurrence of time delays in propagation of data between the master and slaved stations is fundamental to data transmission and is commonly referred to as loop delay wherein those unchanging or constant delay characteristics, such as propagational distance, number of repeaters, type of channel bank equipment, that are inherent to a particular loop define an absolute loop delay and such well-known variables as cable temperature, pulse or phase jitter, etc., define so-called variable delay characteristics for the transmission loop. It is known to provide input data buffer memory banks within the incoming line equipment of the master station for the purpose of writing incoming PCM data into said memory banks and subsequently reading out the stored PCM data from said memory banks at a time commensurate with the formation of the aforementioned composite pulse train. It is convenient herein to speak in terms of a WRITE command or vector generated to accomplish the input of PCM data to the input buffer memory bank and a READ command or vector generated to accomplish the output of PCM data from the input buffer memory bank. Fluctuations in the overall loop delay will result in the faster or slower arrival of incoming PCM data and the writing of said data must then fluctuate in like turn so as not to destroy or distort received PCM information samples. Ideally, the writing function is first accomplished and thereafter, the reading function is accomplished for a given sample of PCM data and the time delay therebetween is referred to herein as an "off-set." The WRITE/READ vector off-set is also presented herein as a physical off-set within the input buffer memory bank with respect to the word/bit slot memory which is being written and the word/bit slot memory which is being read where the input buffer memory bank is comprised of a plurality of word slots equal to the number of channels within a frame period. When the WRITE/READ vectors vary with respect to each other, the variance is called slippage, and more particularly, the term slip, as applied to digital switching systems, refers to an information error caused by the overlapping of the WRITE/READ vectors. Overlapping, of course, is in reference to the WRITE vector having slipped to the degree that a particular word slot within the memory bank is again written (inputted) with new PCM data before the original PCM data stored therein could be read (outputted).

In synchronous transmission links, the absolute loop delay causes an initial WRITE/READ vector off-set but only the variations in the off-set caused by the so-called propagational variables such as cable temperature and phase jitter need be compensated for in order to prevent the overlapping phenomenon. These propagational variables have dimensions of both magnitude and frequency wherein the major component of the magnitude variation is related to temperature changes and the frequency variation is related to the jitter paramemter. As is associated with a T1-carrier transmission format of 24-channels having 8 digit PCM coding propagated at a bit rate of approximately 1.544 megabits per second with a frame period of some 125 microseconds, the phase delay variation due to temperature change is of the order of 4.0 nanoseconds (ns) per mile per °C, while typical jitter variation is of the order of 9.0 ns per repeater stage. It is desired for all transmission loops terminating at the master exchange to send and receive all same-numbered channels within a frame period at substantially the same time. However, the time position (phase) of the incoming pulse data trains are subjected to fluctuations due to variations in the propagational conditions arising from cable temperature changes, lengths of particular transmission loops and a desynchronization effect of phase jitter. The temperature variable is a transmission phenomenon wherein the velocity of propagation along typical cables is a function of the cable temperature along the loop length. Phase jitter resulting from line repeater stations is a quick fluctuation as compared to the relatively slow temperature related change and has various causes such as crosstalk between transmission lines, the induction effect of parasitic periodical signals and the interactions between successively transmitted signals. The amplitude of the phase jitter is cumulative with repeater stations and hence increases in relation to the length of the transmission line. Where the initial difference or off-set between the WRITE/READ vectors is small or very close to zero, even small fluctuations in these propagational variables will cause overlapping.

SUMMARY

It is therefore an object of the present invention to provide for use with a digital PCM TDM switching exchange, a line synchronizer system that will impart a vector off-set between WRITE and READ vector addresses operable within an input data buffer memory bank for the incoming line equipment.

It is another object of the invention to provide a line synchronizer system that will provide an initial WRITE/READ vector off-set upon the occurrence of either a loss of framing synchronization or the equalization of time reference between the WRITE and READ vectors as a prelude to vector slippage.

It is still another object of the present invention to select an optimum minimum input buffer memory capacity of storage for four frames of input data with a guaranteed vector off-set of one frame upon initialization.

In an application of a digital line synchronizer within the incoming line equipment of a synchronized PCM TDM digital switching exchange, PCM T-carrier digital data is received thereto in the form of a continuous unipolar pulse train, the usual data preparation of frame detecting and timing manipulations are performed by standard PCM terminal equipment and thereafter the digital line synchronizer system provides control over the writing and reading of incoming data samples into and out of an input buffer memory unit. The WRITE and READ commands or signals are considered as vector addresses and their movement in time with respect to each other, usually in the sense of providing less (decreasing) time separation between their times of occurrence, is termed slippage. Slippage is caused by known propagational variables affecting the occurrences of the WRITE vector; slippage can cause distortion of stored information when the write signal occurs twice in association with a single memory word slot before the occurrence of a first read out of an initially stored digital word sample, as controlled through the READ signal. It is desired to provide a predetermined WRITE and READ vector address time separation or vector address off-set when either (1) loss of framing occurs or (2) the WRITE and READ vector addresses occur simultaneously, that is reach a state of equivalency.

In a preferred practice of the invention, a digital line synchronizer system is included as part of a PCM line terminating equipment set which receives PCM transmitted data from remote channel bank equipment. The digital line synchronizer provides PCM data as a parallel output to connected incoming group equipment, itself connected to a large digital switching exchange. The line synchronizer is comprised of write address circuit means, off-set control circuit means, address gating logic means and input buffer memory means. The write address circuit means receives input signals developed within preceding PCM terminal equipment having pulse retiming and clock recovery circuits, frame detector and receive digit and receive channel counters. The write address circuit is utilized to store in parallel form eight bits of an input channel sample; and thereafter, to provide stored PCM channel samples as outputs with each occurrence of the WRITE command. The WRITE command is generated during the occurrence of a WRITE WINDOW as determined by system timing reference, i.e., from the occurrence of SYSTEM DIGIT 3 to the later occurrence of SYSTEM DIGIT 7 of each repetitive channel count. The write address circuit provides development of five timing signals WRITE CHANNEL COUNT and a WRITE CHANNEL 1 signal. The former signals are connected to the off-set control circuit and the address gating logic and both the former signals and the latter signal are connected to the off-set control circuit. The off-set control circuit further receives a SYSTEM CHANNEL 1 signal and five SYSTEM CHANNEL COUNT signals for use in an equivalency comparison with the WRITE CHANNEL 1 and WRITE CHANNEL COUNT signals. Logic decoder gates and flip-flop circuits within the off-set control circuit cooperate in the design of the invention to provide selection control over the reading and writing of PCM data samples from selected ones of multiple memory units, each of the memory units having a number of memory word slots corresponding to the number of PCM channel samples words comprising a frame period. Such selection control signals are provided to the address gating logic for developing frame select and channel address signals which determine the appropriate memory unit of the multiple memory units and which memory word slot thereof will then be subjected to either reading or writing functions.

A digital line synchronizer system for use with a communication switching network useful for switching a synchronized digital PCM pulse data train having a plurality of data samples arranged in a cyclic time frame format of repeating frame periods and including sporadically occurring bi-directional phase misalignments due to line variation phenomena, said switching network including system address timing signals of channel and digit occurrences in addition to receive channel and digit occurrences of said PCM pulse train, said line synchronizer system comprising: write address circuit means receiving thereto said PCM data samples in serial presentation, an input recovered clock pulse, loss of framing data, receive digit eight and receive channel one signals, said write address circuit means including storage means for separably storing said PCM data samples, first logic means for providing a WRITE WINDOW time span and a WRITE command during said WRITE WINDOW time span upon receipt of said receive digit eight signal, and second logic means for providing a write address during said WRITE WINDOW including counting means for counting write channels upon each combined receipt of said receive digit eight and receive channel one signals, off-set control circuit means receiving thereto said write address of said second logic means and said system address of said network and including comparison circuit means for comparing said write address and said system address, said comparison circuit providing a first output signal in response to the condition of said write address and said system address being equal, third logic means for said off-set control circuit providing a plurality of WRITE frame signals and being responsive to the sequential receipt of said WRITE command to provide selected ones thereof, fourth logic means for said off-set control circuit providing a plurality of READ frame signals and being responsive to the sequential receipt of a predetermined system timing signal to provide selected ones of said READ frame signals, and logic selection means connected to said third and fourth logic means and responsive to the receipt of either loss of framing or said first output signal of said comparison circuit means to set the logic state for said third logic means to a predetermined logic state with respect to the logic state for said fourth logic means so as to provide a preselected WRITE frame signal, input buffer memory means having a plurality of memory storage means, each thereof connected to receive thereto and to provide therefrom said PCM data samples and each having storage memories for n number of channels of PCM data where there are n channels comprising a frame period, and address gating logic means connected to receive preselected ones of said system digit signals, said system address, said write address and said WRITE and READ frame signals and being responsive thereto to select either reading the stored PCM data from a predetermined one of n number of storage memories of a preselected one of said memory storage means or writing incoming PCM data into a predetermined one of n number of storage memories of a preselected one of said memory storage means, said address gating logic means including fifth logic means receiving said preselected ones of said system digit signals to provide a READ time span within which a READ command occurs.

DETAILED DESCRIPTION

Figure 1:
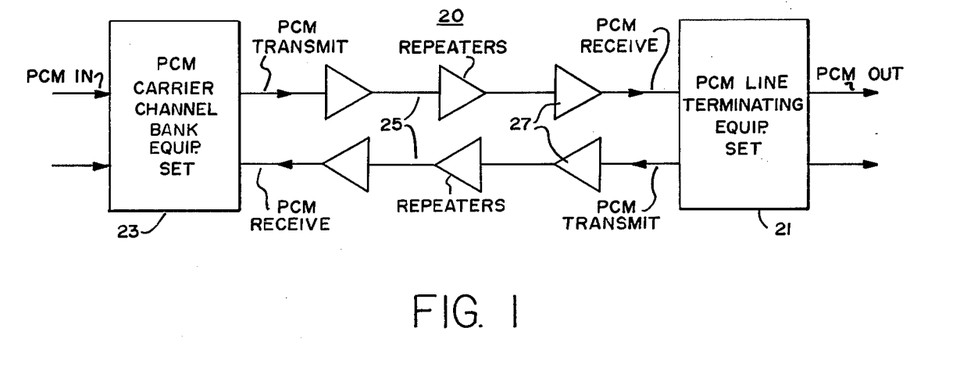
FIG. 1 is a functional representation of a single PCM line equipment in communication with a remote located channel bank equipment station and having a number of intermediate repeater stations.
Figure 2:
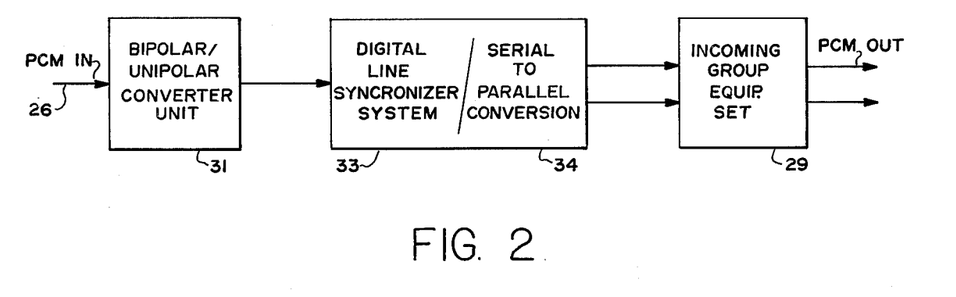
FIG. 2 is a functional block diagram showing a digitial line synchronizer system which is part of the PCM line equipment of FIG. 1 and which incorporates the principles of the present invention.

There is shown in FIG. 1 a well known arrangement for a digital telecommunication loop 20 comprised of a PCM line terminating equipment set 21, a PCM carrier channel bank equipment set 23 and interconnecting transmission trunk highways 25 having multiple repeater stages 27 spaced therealong. The line equipment set 21 receives PCM data as transmitted from the remote carrier channel bank 23 in the form of a serially bipolar pulse data train as indicated at 26 in FIG. 2. The output data from the line equipment set 21 is arranged in parallel format and is connected to a master PCM digital switching exchange (not shown) for the desired routing. The line equipment set 21 is one of a plurality of such line equipment sets which are connected to a single incoming group equipment set 29 as shown in FIG. 2. Multiple numbers of group equipment sets or units 29 can be interconnected to a single master switching exchange as is thought to be well understood in the pertinent art.

FIG. 2 shows a bipolar/unipolar converter unit 31 which receives the PCM pulse train 26 arranged in the T-carrier bipolar 50% duty cycle format and converts the same to a unipolar format, a digital line synchronizer system 33 in accordance with the principles of the present invention and the incoming group equipment 29. The digital line synchronizer 33 should be understood to perform the serial to parallel conversion as shown in FIG. 2 at 34 and to provide output PCM data in parallel format to the group equipment 29. The detailed operations of and logic circuits for the units 23, 27, 29 and 31 will not be given herein as these are standard units and their presentation would unduly lengthen the present disclosure. The digital line synchronizer 33 is conveniently applied within a synchronized PCM digital switching exchange in the same manner as is shown for the line synchronizer system 33 of copending patent application U.S. Ser. No. 532,540, filed Dec. 13, 1974, and assigned to a common assignee with the present invention.

Figure 3:
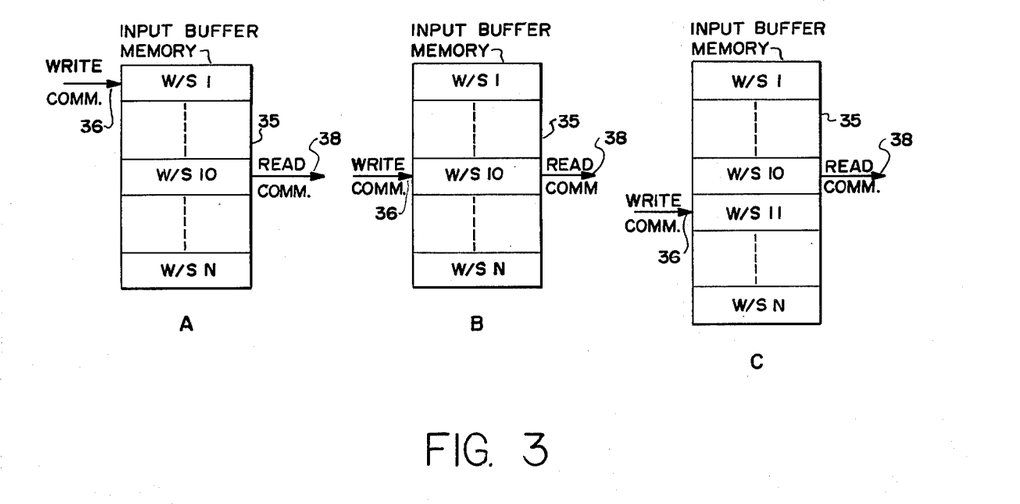
FIG. 3 is a graphical representation of an input buffer memory bank having N number of word slots for data storage wherein A, B and C illustrations of the memory bank each show a different relationship between a WRITE vector and a READ vector, namely, vector off-set, vector equalization and vector slippage, respectively.

FIG. 3 shows three separate illustrations A, B and C of an input buffer memory bank 35 having 1 to N number of separate input word slots W/S for storage and subsequent readout of input PCM data samples. The input buffer memory 35A shows an incoming WRITE command or signal 36, sometimes referred to herein as the WRITE vector, and an outgoing READ command or signal 38, sometimes referred to herein as the READ vector. The WRITE command 36 is representative of a first control signal used to select that an incoming PCM data sample be written or recorded in an associated work slot of the input buffer memory 35. The READ command is representative of another or second control signal used to select that a previously recorded data sample within an associated word slot be read out. The frequency of arrival of the input PCM data samples is substantially synonymous with the frequency of the occurrence of the WRITE command 36. The frequency of the READ command 38 is a relatively fixed constant controlled by the internal operation of the master clock frequency of the master switching exchange. As previously explained, the variable propagational characteristics will cause the writing function to vary in its occurrence. The input buffer memory 35A shows a first relationship between the read and write functions whereby the WRITE command 36 causes an input data sample to be stored in word slot W/S 1 while the READ command 38 causes the removal of a previously stored data sample from work slot W/S 10. Therefore, the off-set between WRITE vector 36 and the READ vector is seen to be a nine channel off-set which is the result of a combination of factors including the present temperature of the switching facility, the incoming frequency of the received PCM data, the total loop delay in a synchronous application, and even the arbitrary data frame positioning of the system and the channel bank data frames.

Figure 5:
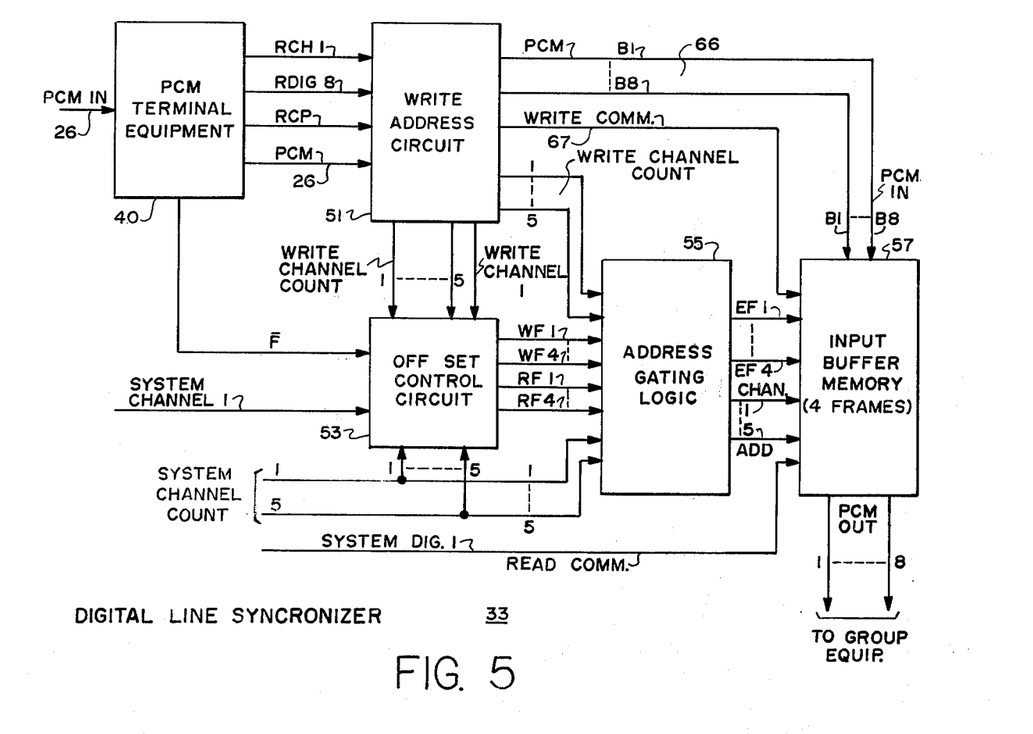
FIG. 5 is a functional block diagram of the digital line synchronizer system of FIG. 2 showing four major subsystems comprising the same, namely, write address, off-set control, address gating logic and input buffer memory subsystems.

There is shown by the input buffer memory 35B a second relationship between the read and write functions whereby the WRITE command 36 has continued to increase in its frequency of occurrence until it has become associated with the word slot W/S 10 while the READ command 38 has remained associated with the word slot W/S 10. There is now obviously zero channel position off-set between the WRITE and READ vectors 36 and 38 respectively, and the two vectors are said to have reached a condition of equivalence. It is in this near equivalence condition of the vector addresses, that even small fluctuations in propagational variables will cause an overlapping of the WRITE and READ vectors 36 and 38, respectively. The input buffer memory 35C shows a third relationship known as the overlapping condition whereby the WRITE command 36 has now become associated with the word slot W/S 11 while the READ command 38 has remained associated with the word slot W/S 10. The WRITE command 36 is said to have slipped so that a new PCM data sample has been recorded in word slot W/S 11 before the READ command 38 could cause the previously recorded PCM data sample therein to be read out; thus, data loss and information distortion has occurred. When the initial off-set or vector address difference between the read and write vectors is substantially zero, small fluctuations in operating temperature or changes in jitter characteristics may cause the WRITE vector 38 to oscillate back and forth between conditions depicted in the second and third illustrated relationships of 35B and 35C, thus causing a much higher error rate than would be calculated for either known clock frequency differences or buffer length. The digital line synchronizer 33 of the present invention, as shown in FIG. 5, is intended to provide an initial vector address off-set between the WRITE and READ vectors 36 and 38, respectively. When the overall communication loop of FIG. 1 is initialized for service, a predetermined vector off-set would be established so that a slip free input buffer memory 35 could be designed for any chosen length of snychronous transmission line. Furthermore, when a read-write vector slip would occur due to the occurrence of parameters beyond design specifications, the line synchronizer system 33 would re-initialize itself for a return to the initial or guaranteed vector off-set. Also, when loss of framing occurred, reframing would signal a return to the initial vector off-set.

In order to provide for initialization on either of two selected conditions of operation, namely, read-write vector address equivalency and reframing following a loss of framing, there must be provided two word slots of buffer memory for each incoming channel of the 24 channels for the T-carrier format. If channel n is arriving on the incoming PCM line 26, there are provided two channel n word slots in the total buffer memory for writing PCM information. Upon initialization occurring, the channel n word slot further removed in time reference from the READ vector 38 will be selected for the writing function. Thus, the minimum input buffer memory size thought to be required to implement the technique of the present invention is a two frame storage capacity, that is, a 48-channel input buffer memory. The minimum guaranteed vector off-set for such an input buffer size would be 12 channels. For reasons of convenience in the implementation of the present invention, an input buffer size having a four frame storage capacity is disclosed for the digital line synchronizer 33 wherein there is provided a guaranteed vector off-set of one complete frame. For example, if the READ vector 38 was then located in frame 2 of the four frame storage unit, irregardless of the particular channel position within frame 2, upon initialization of the digital line synchronizer 33, the WRITE vector 36 would then be positioned in frame 4. It is seen, therefore, that if the READ vector 38 was positioned for channel 24, frame 2 and the WRITE vector 36 was positioned for channel 1, frame 4, that a minimum vector off-set of one frame would result.

Figure 4:
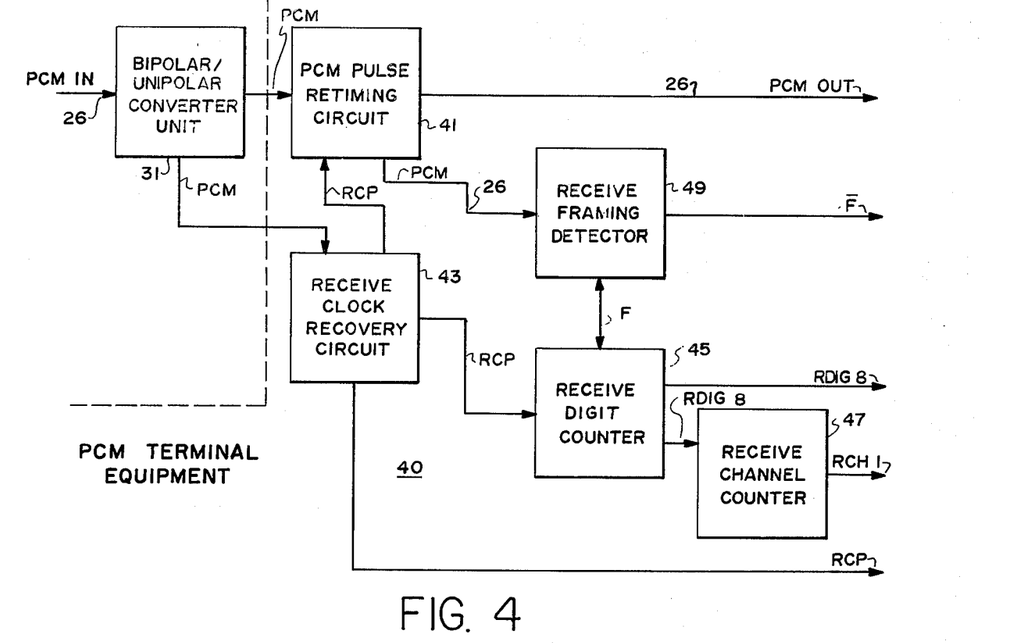
FIG. 4 is a functional block diagram of a selected portion of the PCM line equipment of FIG. 1 as shown separately from the digital line synchronizer system of FIG. 2.

FIG. 4 shows an equipment grouping known as PCM terminal equipment 40 which is part of the PCM line terminating equipment set 21 of FIG. 1 and which grouping 40 can be conveniently considered as an initial part of the digital line synchronizer system 33 of FIG. 2. This relationship is further demonstrated in FIG. 5 wherein the PCM terminal equipment 40 can be seen to comprise the initial equipment section of the digital line synchronizer 33. However, the fundamental operation of the digital line synchronizer 33 does not include the signal preparatory section 40. In FIG. 4, there is shown the bipolar/unipolar converter unit 31 receiving thereto the PCM pulse train 26, converting the pulse train 26 to the unipolar format and transmitting the same to two sections of the PCM terminal equipment 40, namely, a PCM pulse retiming circuit 41 and a receive clock recovery circuit 43. The detailed operations and logic configurations of each section of the PCM terminal equipment grouping 40 will not be given herein as these are standard circuits well known in the PCM telephonic communications field.

In further reference to FIG. 4, the received clock recovery circuit 43 provides an output signal RCP meaning the recovered clock pulse, which is connected to the PCM pulse retiming circuit 41. The retiming circuit 41 utilizes the recovered clock pulse RCP to retime the transmittable PCM pulse train 26 for synchronization purposes. The recovered clock pulse RCP is also provided from the recovery circuit 43 to a receive digit counter 45 which counts up to the eight (8) received digits that comprise a PCM channel sample and provides an output signal called receive digit eight (RDIG 8) upon the occurence of the eighth received digit. The receive digit counter 45 is part of the standard receive clock timing extractor design of most PCM terminal equipments. A receive channel counter 47 is provided for counting the occurrence of channels, said channel counter 47 receiving thereto the output signal RDIG 8 and developing a channel one (CH 1) count output signal RCH 1 upon the completion of each frame. A receive framing detector 49 monitors the retimed PCM pulse train 26 for maintaining framing synchronization. The output signal $\overline{F}$ is provided upon loss of framing and so long as framing synchronization is maintained, the output signal F is connected to the receive digit counter 45 for referencing the counting operation thereof. Accordingly, the PCM terminal equipment grouping 40 provides a total of five output signals to the digital line synchronizer 33, namely, PCM pulse train 26, $\overline{F}$, RDIG 8, RCH 1 and RCP. It is in the PCM terminal equipment 40 that the receive digit count, channel count and clock frequency are recovered or regenerated. The PCM pulse train 26 is retimed and regenerated. A loss of framing or out of frame signal $\overline{F}$ is generated whenever the receive terminal equipment cannot locate the incoming frame. This is all standard terminal equipment, such as Lenkurt Part No. 400-910002-02.

FIG. 5 shows the digital line synchronizer system 33 according to the principles of the present invention wherein there is provided a write address circuit or substem 51, an off-set control circuit or subsystem 53, an address gating logic subsystem 55 and an input buffer memory subsystem 57 having storage capacity for four successive frames of input data having 24 channels per frame. The output signals RCH 1, RDIG 8, RCP and PCM 26 as retimed from the PCM terminal equipment 40, are provided through connection to the write address circuit 51. The write address circuit 51 is utilized to (1) prepare and present the PCM pulse data for writing into the input buffer memory 57, (2) generate a write channel count address for the input buffer memory 57, and (3) generate a write pulse properly correlated to the master system clock timing. The frame selection made for the input buffer memory 57 for both reading and writing is formulated in the off-set control circuit 53. The address gating logic 55, in its most basic function, selectively enables the read address or the write address to be alternately applied to the input buffer memory 57 under the timing control of the master system clock (not shown). The reading of the input buffer memory 57 is done only during occurrences of system digit 1 and system digit 2 of every system channel time, during a so-called READ time or READ WINDOW. The writing of the input buffer memory 57 is permitted to occur at any other system digit time of every system channel time, during a so-called WRITE time or WRITE WINDOW. All necessary system timing pulses are assumed to be available for use and the present disclosure does not disclose their formulation or origin but merely shows the application thereof in connection with the present invention.

Figure 6:
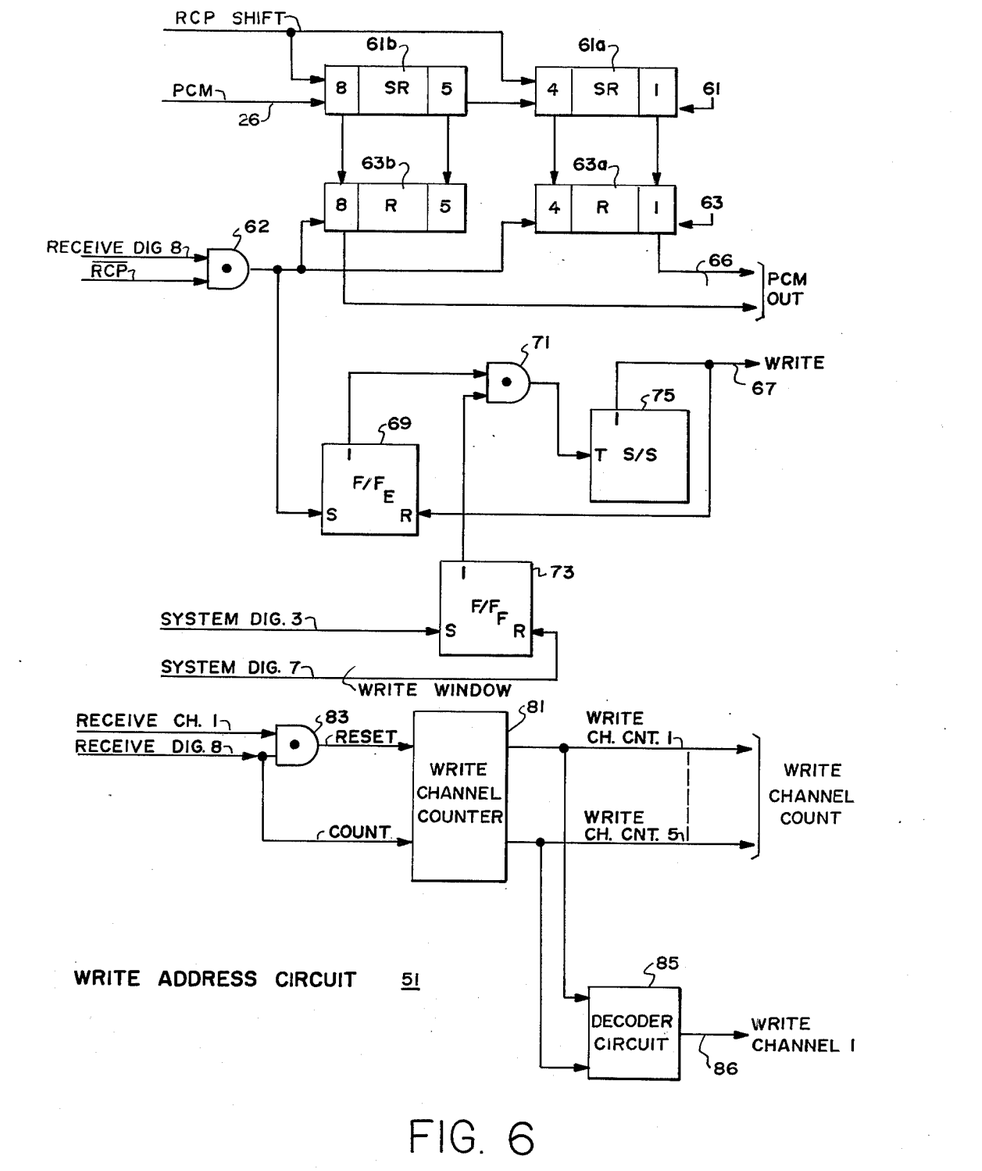
FIG. 6 is partially a functional block diagram and partially a logic diagram of the write address subsystem of FIG. 5.

Referring simultaneously to both FIGS. 5 and 6, the write address circuit 51 receives the retimed PCM pulse train 26 within an 8-digit shift register 61, each incoming data channel being successively shifted in the shift register SR one digit at a time under the reoccurring enablement of the output signal RCP connected from the receive clock recovery circuit 43. The 8-digit shift register 61 is conveniently represented in FIG. 6 as comprised of two 4-bit shift registers 61a and 61b. As the eighth bit of a channel is shifted into the final or eighth register stage, the logic combinations, as determined by a logic AND gate 62, of the receive digit 8 RDIG 8 signal and a derived clock pulse logically represented as $\overline{RCP}$ enables an 8-digit storage register 63 to simultaneously shift out in parallel formal all 8 digits of a stored channel sample, as shown at 66 in FIG. 6. The storage register 63 is connected in tandem to the shift register 61, as shown in FIG. 6, for the purpose of receiving and holding the eight digits comprising a channel data sample during the successive accumulation of the incoming bits or digits of the following channel data sample. The shift of the PCM data from the storage register 63 permits the parallel transfer of the eight digits in the shift register (SR) 61 to the storage register (R) 63. The 8-digit storage register 63 is also conveniently represented in FIG. 6 as a pair of two 4-bit registers 63a and 63b. The success of this data transfer operation is predicated upon the synchronization of the retimed PCM pulse 26 and the receive digit 8 pulse RDIG 8. The transfer operation between the registers 61 and 63 can be utilized to generate a suitable timing signal to indicate that new information is available for writing into the input buffer memory 57. FIG. 5 clearly shows the eight bits B1 through B8 of PCM OUT information which comprises a channel sample being connected as PCM IN data to the memory 57.

The aformentioned timing signal for controlling the writing of PCM data into the memory 57 is identified in the drawings as a WRITE command and is shown at 67. The positive logic signal provided from the logic gate 62 enables the shift of data from the register 63 and also is used to SET the flip flop F/F E, 69, of FIG. 6. During the SET condition of the flip flop 69, a positive logic signal is connected to a second logic AND gate 71. If a second flip flop F/F F, 73, is also in the SET condition due to the past receipt of a system digit 3 signal, the gate 71 is enabled and a third flip flop F/F, 75, is triggered (T) to present a positive logic output which serves as the WRITE command 67. The occurrence of the WRITE command is utilized to RESET the flip flop 69 until the logic combination of RDIG 8 and RCP reoccur to activate the gate 62. Furthermore, it is shown in FIG. 6 that the generation and receipt of a system digit 7 operates to RESET the flip flop 73 and prevent the generation of the WRITE command 67.

The resetting of the flip flop 73 makes it possible to assure the exclusive reading of the memory 57 without the occurrence of a writing operation during system digit 1 and system digit 2 times as previously stated. Regardless of the SET condition of flip flop 69, no WRITE command 67 will be generated until the occurrence of system digit 3 which signals the beginning of the so-called WRITE WINDOW as determined by the operation of flip flop 73. The flip flop 73 is set from the leading edge of the system digit 3 pulse and reset from the leading edge of the system digit 7 pulse. The WRITE WINDOW therefore endures for or corresponds to 4-bit positions of each system channel time. The interfunctioning of the flip flop 69 and 73 make it possible to correlate the memory write time of the memory 57 with the system timing.

It is to be noted that when channel $y$ is held in the storage register 63 in readiness for writing into the memory 57, channel ($y$+1) is being shifted into the shift register 61. In order to insure that the proper write address is stable during the occurrence of the WRITE WINDOW, a write channel counter 81 is provided, FIG. 6. Proper timing of the register operations requires that as the eighth digit of the channel ($y$+1) occurs, the read out of channel $y$ occurs. Hence, the write channel counter 81 must lag the receive channel counter 47 by 7 bit positions; the write channel counter 81 must be off-set to insure that the PCM information being written goes to the correct memory slot within the memory 57. To obtain the desired off-set, a separate channel counter is used as shown in FIG. 6. The write channel counter 81 is initially reset upon the occurrence of receive channel one RCH 1 through the use of a logic AND gate 83, and is thereafter successively incremented by the receive digit eight RDIG 8 pulses. The write channel counter 81 provides a first channel count WRITE CH. CNT. 1 through a fifth channel count WRITE CH. CNT. 5 with each incrementation thereof during the occurrence of the WRITE WINDOW. One of the five write channel counts is provided directly to the off-set control circuit 53 and to the address gating logic 55 as best shown in FIG. 5. In addition thereto, the WRITE CH. CNT. 1–5 are processed through a suitable decoder circuit 85 to provide a separate output signal WRITE CH. 1 at 86 for connection to the off-set control circuit 53, FIG. 7, for a purpose to be explained hereinafter.

Figure 7:
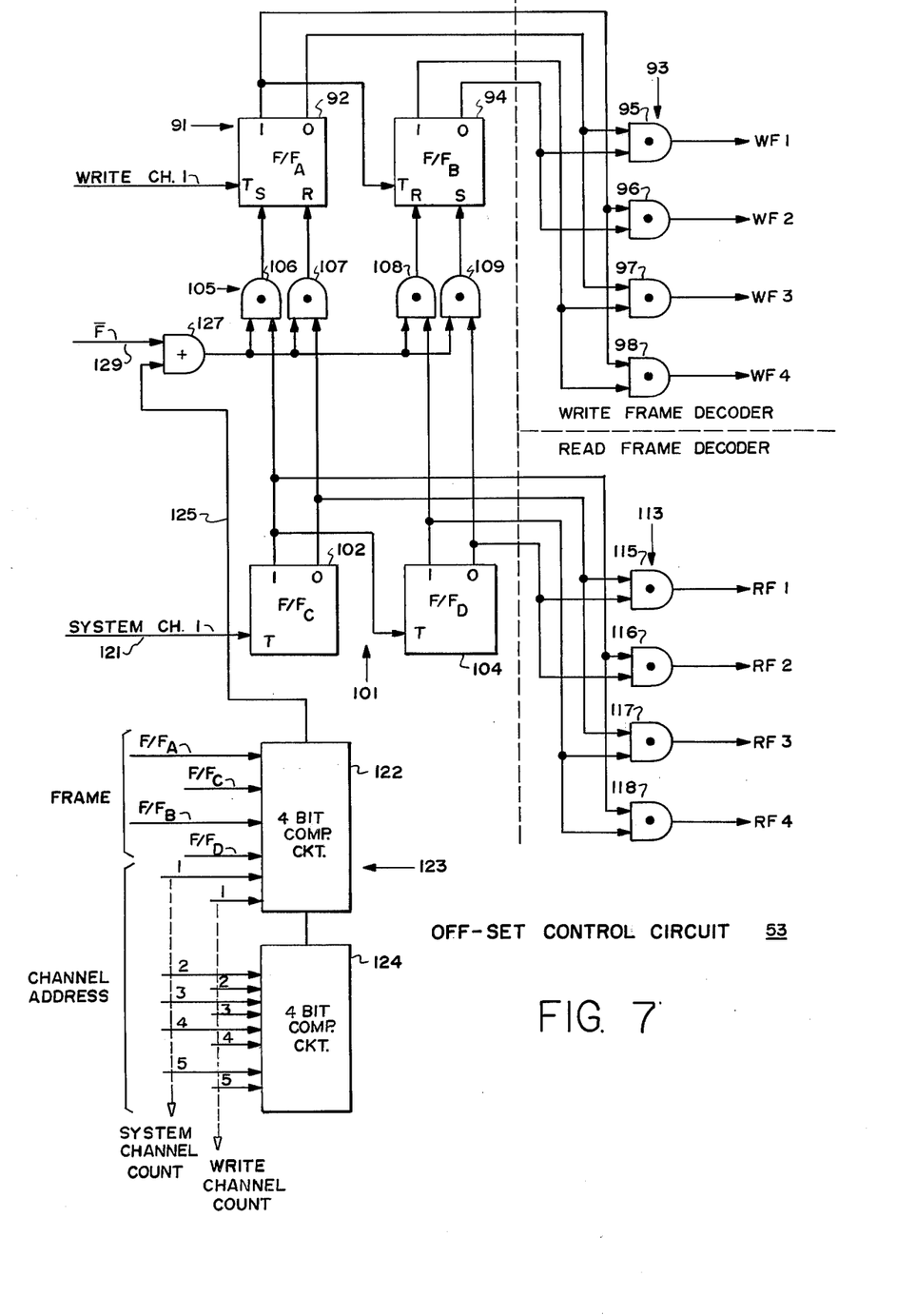
FIG. 7 is partially a functional block diagram and partially a logic diagram of the off-set control subsystem of FIG. 5.

The frame selection required for the input buffer memory 57 for both reading and writing is generated in the off-set control circuit 53 as shown in FIG. 7. The WRITE CH. 1 signal is used to increment a 2-bit counter 91 comprised of the flip flop logic circuits F/F A, 92, and F/F B, 94. The 2-bit counter 91 is called a write frame counter and provides its SET/RESET states to a 4-gate write frame decoder 93 comprised of logic AND gates 95–98. The outputs of the write frame decoder 93 are identified as write frame one through write frame four, WF1–WF4 which pulses comprise the write enable addresses. The logic signals WF1–WF4 are connected to the address gating logic 55 as is shown in FIG. 5. It is seen from a consideration of FIG. 7 that gate 95 is selectively enabled by the RESET conditions of the flip flops 92 and 94; that gate 96 is enabled by the SET conditions of F/F 92 and the RESET condition of F/F 94; that gate 97 is enabled by the RESET condition of F/F 92 and the SET condition of F/F 94; and that gate 98 is enabled by the SET conditions of flip flops 92 and 94.

Also in FIG. 7, there is shown another or a second 2-bit counter 101 comprised of the flip flop logic circuits F/F C, 102, and F/F D, 104. The 2-bit counter 101 is called a frame select counter and provides its SET/RESET states to the 2-bit counter 91 through a 4-gate decoder network 105 comprised of logic AND gates 106–109 for a purpose to be set forth hereinafter and to a 4-gate read frame decoder 113 comprised of logic AND gates 115–118. The outputs of the read frame decoder 113 are identified as read frame one through read frame four, RF1–RF4, which pulses comprise the read enable addresses. The logic signals RF1–RF4 are connected to the address gating logic 55 as is shown in FIG. 5. It is seen that the gate 115 is selectively enabled by the RESET conditions of the flip flops 102 and 104; that gate 116 is enabled by the SET condition of F/F 102 and the RESET condition of F/F 104; that gate 117 is enabled by the RESET state of F/F 102 and the SET state of F/F 104; and that gate 118 is enabled by the SET states of the flip flops 102 and 104.

The frame select counter 101 is systematically incremented by the reoccurrence of the channel one count of the system timing, as is shown at 121 by the signal SYSTEM CH. 1. The counting operations of the two counters 91 and 101 are seen to be independent of each other as would be expected from the earlier explanation of FIG. 3 wherein the WRITE vector was a variable under the control of the transmission loop 20 and the READ vector was more nearly a constant under the control of the master switching exchange reference timing, herein referred to as the system timing. Among the stated objects of the invention, was to provide an initial WRITE/READ vector off-set upon the occurrence of either a loss of framing synchronization or the equalization of time reference between the WRITE and READ vector as a prelude to vector slippage and information distortion. Until either of these two situations occur, the operation of the counter 91 is permitted to depend only upon the operation of the write channel counter 81 of FIG. 6.

There is also shown in FIG. 7 a READ/WRITE vector address equivalence circuit 123 comprised of two 4-bit comparator circuits 122 and 124 of standard configuration as compared to known commercially available 4-bit comparator circuits. The comparator circuit 122 is provided with inputs comprised of the SET states of the four flip flops 92, 94, 102 and 104, being indicated in the drawing as F/F A, F/F B, F/F C and F/F D, as well as the system channel count one SYSTEM CH. CNT. 1 of the system reference timing and the write channel count one WRITE CH. CNT. 1 as provided from the decoder 85 in FIG. 6. The four SET states of the flip flops 92, 94, 102 and 194 comprise the frame identification signals of the memory 57 provided as inputs to the comparator circuit 122, that is, identification of the particular frame being utilized for both reading and writing functions. The comparator circuit 124 is provided with inputs comprised of the system channel counts two through five SYSTEM CH. CNT. 2 — SYSTEM CH. CNT. 5 as well as the write channel counts two through five WRITE CH. CNT. 2— WRITE CH. CNT. 5. The five system channel counts and the five write channel counts comprise the channel address identification signals of the memory 57 for both system and receiving timing provided as inputs to both the comparator circuits 122 and 124, that is, identification of the particular word/slot or channel slot within a memory frame being utilized for both reading and writing functions. At a time when the frame and channel address inputs compare to be equal because the WRITE/READ vector off-set being nearly zero as shown in the illustration of 35B in FIG. 3, a positive logic output is provided by the equivalence circuit 123 on lead 125 to an OR logic gate 127. Vector equivalence means that the write channel counter 81, including the frame selection, is equal to a system channel counter (not shown); vector equivalence means that the WRITE vector is addressing the same channel slot within the same memory frame of the input buffer memory 57 as is the READ vector.

If either a loss of framing is detected by the PCM terminal equipment 40 and provided to the OR gate 127 as $\overline{F}$ 129, or read-write vector address equivalence is detected resulting in a positive logic signal to the gate 127 on lead 125, the write frame counter 91 is forced to a state which guarantees the minimum vector off-set through disabling the incrementing WRITE CH. 1 signal from the write channel counter 81 and the system channel counter (not shown) is allowed to operate freely. More specifically, the 2-bit write frame counter 91 will be preset by the 2-bit frame select counter 101 through the enablement of the gating network 105 while the 2-bit frame select counter 101 will continue to operate freely under the continued incrementing of each system channel one SYSTEM CH. 1 signal representing the repetitive occurrence of each system frame. It is realized from a consideration of FIG. 7 that with the positive logic state of gate 127, F/F 92 is forced to follow the changing states of F/F 102 through selective enablement of AND gates 106 and 107. Likewise, as AND gate 108 and 109 are enabled, F/F 94 is forced to follow the inverse states of F/F 104. Once the vector addresses no longer compare as being equivalent or framing synchronization is restored, both the write frame counter 91 and the frame select counter 101 are enabled to operate independently with respect to each under the incrementation of WRITE CH. 1 and SYSTEM CH. 1 signals, respectively, and the read-write vectors are found to be separated by a minimum of one frame position due to the write frame counter 91 having been forced to assume a logic state controlled by the frame select counter 101.

From a consideration of FIG. 7, it is realized that gates 95–98 are triggered by write frame counter 91 logic states of 00, 10, 01 and 11, respectively. Likewise, the gates 115–118 are triggered by frame select counter 101 logic states of 00, 10, 01 and 11, respectively. Hence, a write frame count of 00 results in the generation of the write frame decoder signal WF1 for selecting a write function within the first of the four memory banks of the input buffer memory 57, and within a channel/word slot selected by the channel address logic of WRITE CH. CNT. 1–5. A frame select (system frame) count of 00 results in the generation of the read frame decoder signal RF1 for selecting a read function within the first of the four memory banks of the input buffer memory 57, and within a channel/word slot selected by the channel address logic of SYSTEM CH. CNT. 1–5. When the reading and writing functions occur within the same memory frame so that the equivalence condition of 35B exists and the channel address signals of write frame and system frame compare to be equal, the write frame counter will be immediately preset to the existing state of F/F 102 and the inverse state of F/F 104 (count 01), resulting in the enablement of gate 97 for selection of a write address signal within the third of the four memory frames. It is to be noted that the condition of WRITE/READ vector equivalency involves equal channel addresses for the system and write channel counts and following the imposed logic condition of the frame select counter 101 upon the write frame counter 91, the channel addresses for the system and write channel counts remain equal but removed into separate memory frames. Hence, the WRITE/READ vector address off-set is exactly 48 channel/word slots. Furthermore, the initilization of the off-set control circuit 53 through logic operation on the write frame counter 91 has been immediate and the reading and writing of PCM data continues without interruption of service because of the removal of the positive logic signal on lead 125 from the equivalence circuit 123.

If instead framing synchronization is lost at such time as the write frame count is 01, resulting in writing PCM data in frame three (WF3) in some selected channel/word slot, and the system frame count is 10, resulting in reading PCM data in frame two (RF2) in some other selected channel/work slot, the write frame counter 91 will immediately be locked to the abovestated logic relationship with the frame select counter 101 and will remain so locked until the subsequent removal of the signal $\overline{F}$ upon framing synchronization being regained. When framing is regained, the write frame count is set according to the then existing system frame count. It is seen that the system timing continues during loss of framing so that the frame select counter 101 continues to be incremented by the signal SYSTEM CH. 1. However, during a loss of framing, the writing function does not involve integrity of incoming PCM data and some suitable provisions must be made in the control of the master swtiching system to either ignore such written data or to prohibit the continued operation of the frame select counter 101. This is readily within the state of the art and will not be discussed in connection with the present invention. Assuming upon framing being regained that the system frame count is 10, the write frame count will be immediately set to 11, resulting in writing PCM data in frame four (WF4) in some selected channel/word slot different from that upon the event of loss of framing. The reading function will be occurring in some other channel/word slot of frame two (RF2) and the actually channel separation of the WRITE/READ vectors may be only 24 channels (one frame period) minimum; thus, a minimum WRITE/READ vector address off-set of one (1) frame period is provided by the present invention.

Figure 8:
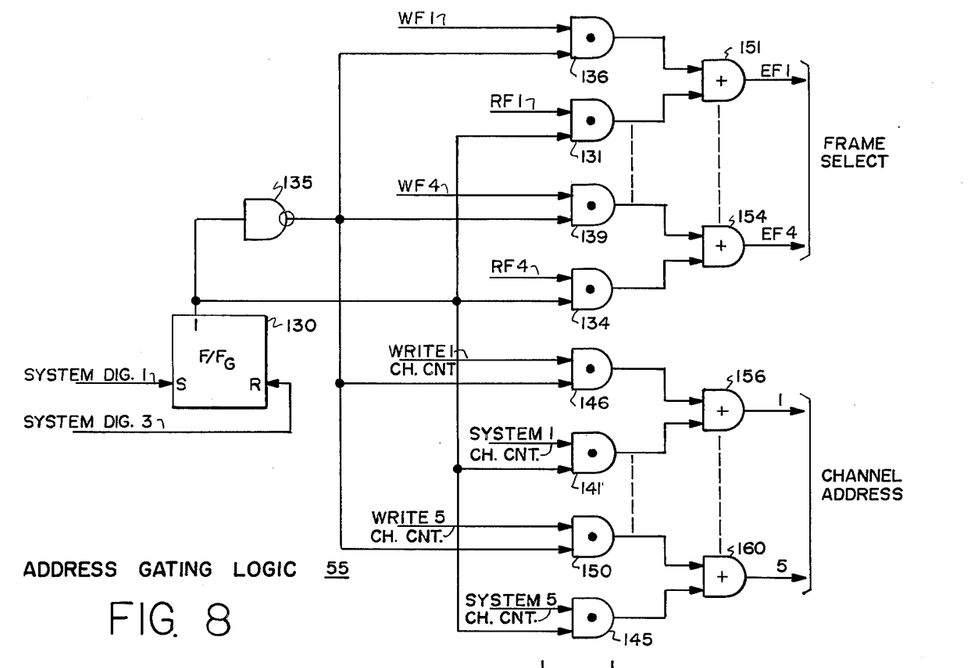
FIG. 8 is primarily a logic diagram of the address gating logic subsystem of FIG. 5.

FIG. 8 shows the address gating logic 55 which receives, as shown in FIG. 5, the five write channel counts WRITE CH. CNT. 1 — WRITE CH. CNT. 5, the five system channel counts SYSTEM CH. CNT. 1—SYSTEM CH. CNT. 5, the four write frame decoder signals WF1–WF4, and the four read frame decoder signals RF1–RF4. A flip flop F/F G, 130, is utilized so that it is SET by a system digit one SYSTEM DIG. 1 signal and RESET by a system digit three SYSTEM DIG. 3 signal, which time period has been disclosed to comprise a READ WINDOW, outside of the WRITE WINDOW, so that the reading function is permitted. The logic one signal of F/F 130 is connected to each of four logic AND gates 131–134 which receive the four read frame decoder signals RF1–RF4. Only the gates 131 and 134 are actually shown in FIG. 8 and the gates 132 and 133 are indicated for inclusion by dashed lines. An inverter gate 135 provides a logic zero signal from the F/F 130 to each of four logic AND gates 136–139 which receive the four write frame decoder signals WF1–WF4. Only the gates 136 and 139 are actually shown in FIG. 8 and the gates 137 and 138 are indicated for inclusion by dashed lines. Further, the logic one signal of F/F 130 is connected to five additional logic AND gates 141–145 to which the five system channel count signals SYSTEM CH. CNT. 1 — SYSTEM CH. CNT. 5 are connected respectively, that comprise the read channel address. Further, the logic zero signal of gate 135 is connected to five additional logic AND gates 146–150 which gates receive thereto the five write channel counts WRITE CH. CNT 1 — WRITE CH. CNT. 5, respectively, that comprise the write channel address.

It is to be noted that the write and read frame one WF1 and RF1, respectively, are further connected to an OR logic gate 151 in order to provide for an alternate selection between writing and reading functions. Since there are four combination pairs of write and read frame decoder signals WF1–RF1, WF2–RF2, WF3–RF3 and WF4–RF4, there are three additional OR logic gates 152–154 provided of which only gate 154 is shown in FIG. 8. The output signals of the OR gates 151–154 are identified as EF1–EF4 and comprise frame select signals because each such signal serves as an enable signal to one of the four memory banks (frames) of the input buffer memory 57, as is shown clearly in FIG. 9. Similarly, each correspondingly numbered pair of write and system channel count pulses are compared by an associated OR gate to provide five such OR gates 156–160 whereby there is provided an alternate selection between write and system channel count occurrences. The output signals of the OR gates 156–160 are identified as CHANNEL ADDRESS 1 through CHANNEL ADDRESS 5 and comprise channel address selection pulses which are provided to each of the four memory banks (frames) of the memory 57 to identify which selected one of 24 word slots will be made subject to a read or write function.

Figure 9:
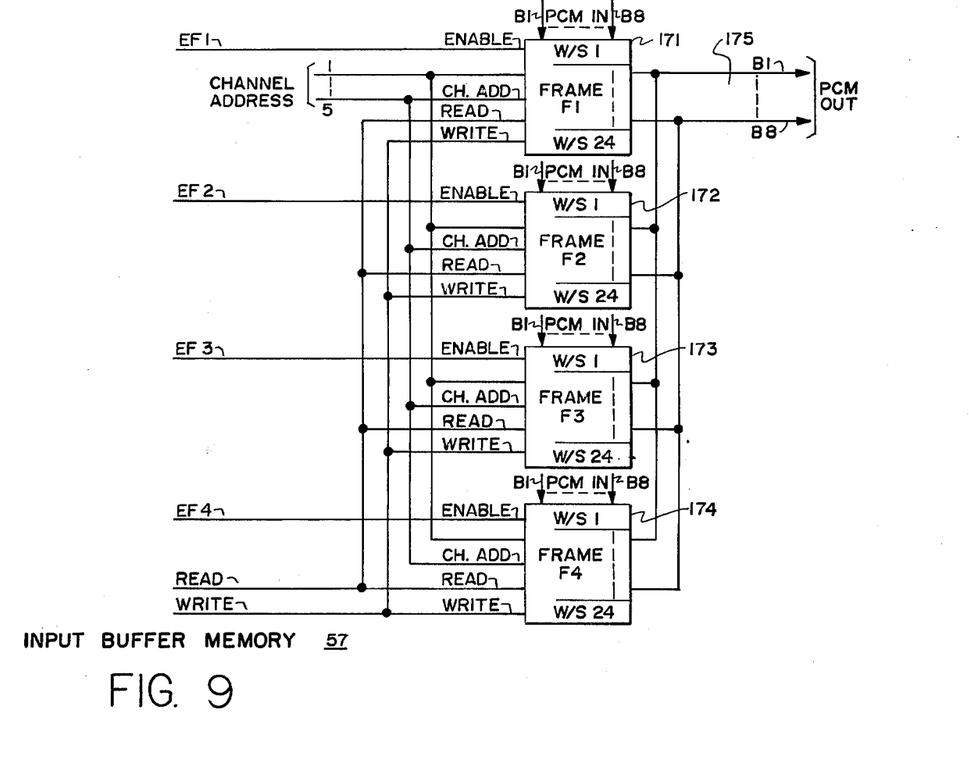
FIG. 9 is a functional block diagram of the input buffer memory subsystem of FIG. 5.

FIG. 9 shows the input buffer memory 57 comprised of four memory banks or frames 171–174, each thereof connected to receive the incoming pulse train of PCM data, conveniently designated herein as frames F1–F4, respectively. Each of the memory banks 171–174 contain 24 memory word slots W/S 1 – W/S 24, and each word slot can receive upon selection thereof the retimed PCM data 26 as an input provided from the storage register 63 of the write address circuit 51. The generation of either the WRITE command 67 or the READ command (SYSTEM DIG. 1) determines the selection of either the writing or reading function for the memory banks. The frame select signals EF1–EF4 are used to enable one the memory banks 171–174 while the CHANNEL ADDRESS logic indicates the particular word slot to be used within the enabled memory bank. Upon the read function being selected by the operation of FIG. 8, a predetermined word slot of one of the memory banks 171–174 provides a PCM OUT data sample as shown at 175, in parallel format to the incoming group equipment set 29.

It is to be noted that very little disclosure has been set forth with respect to the development of the various system timing signals that are utilized in connection with the present invention as such system timing is well known. It is also to be understood that while the present invention has been shown and described with respect to a preferred enbodiment thereof, the scope of the invention is not intended to be so limited and other equally suitable and equivalent modifications and changes may be made therein without departing from the spirit and scope thereof.

What is claimed is:

1. A digital line synchronizer for use with a synchronized pulse code modulated switching network having a plurality of connecting bidirectional signal lines, each carrying a PCM pulse data train comprised of a plurality of coded signals arranged in a first cyclic time frame format of repeating channel and frame periods and being switched through said network in time reference to a second cyclic time frame format of repeating channel and frame periods, said digital line synchronizer comprising write address means connected to one of said signal lines and including register means receiving thereto serially arranged coded signals of said first time frame format and providing therefrom said coded signals in a parallel arrangement, means for enabling the release of said parallel coded signals from said register means upon the occurrence of each completed channel period of said first frame format, means for generating a write command signal during a preselected portion of each channel period of said second frame format, counting means initiated by each repeating frame period of said first frame format and incremented thereafter with each completed channel period thereof, the count states of said counting means comprising write channel addresses and the occurrence of each count state comprising a write incrementing signal, off-set control means including first logic counter means triggered by said write incrementing signals, respectively, to provide a number of first logic states, first decoder means responsive to said first logic states to provide a corresponding number of write frame signals therefrom, second logic counter means triggered by the occurrence of preselected channel periods of said second frame format, respectively, to provide a number of second logic states, second decoder means responsive to said second logic states to provide a corresponding number of read frame signals therefrom, logic comparison means receiving preselected logic states from said first and said second logic counter means for comparing the logic states thereof for a first condition of equivalence, and receiving said write channel addresses together with the channel identifications of said second frame format comprising system channel addresses for comparing said write and said system channel addresses for a second condition of equivalence, first gating means responsive to either a loss of framing synchronization for said first frame format or to said first and second conditions of equivalence to reset said first logic states of said first logic counter means to a predetermined logic relationship with respect to said second logic states of said second logic counter means whereby the write frame signal from said first decoder means is selectively altered, address gating logic means including means for generating a read command signal during another preselected portion of each channel period of said second frame format and third decoder means receiving said write and said read frame signals and said write and said system channel addresses for alternate selection thereof, respectively, and input buffer memory means including a plurality of separate memory frames equal to the number of write frame signals and read frame signals, respectively, each memory frame having a plurality of memory storage means equal to the number of channel periods of said first and second frame formats, respectively, and further receiving thereto said released parallel coded signals from said register means and storing the same upon receipt of said write command signals from said generating means therefor, and providing said coded signals as PCM data outputs therefrom upon receipt of said read command signals, said write or said read frame signals being effective to select said memory frame and said write or said system channel addresses being effective to select said memory storage means within said memory frame.

2. A digital line synchronizer as claimed in claim 1 wherein said register means is comprised of shift register means receiving thereto the serially arranged coded signals of said first time frame format and storage register means receiving in parallel form from said shift register immediately preceding ones of the coded signals, and said means for generating a write command signal is comprised of a first bistable logic circuit triggered by the completion of a channel period of said first frame format, a second bistable logic circuit triggered by the occurrence of said preselected portion of each channel period of said second frame format, and a third bistable logic circuit triggered by the ANDING of the positive states of said first and second bistable logic circuits to provide a positive state comprising said write command signal.

3. A digital line synchronizer as claimed in claim 1 wherein said first and second logic counter means comprise a pair of bistable logic circuits, respectively, a second bistable logic circuit of said pair thereof being triggered by the occurrence of the positive logic state of a first bistable logic circuit of said pair of such logic circuits, and said first logic states of the first logic counter means being reset to the same logic state of the one bistable logic circuit of the second logic counter means and to the inverse logic state of the other bistable logic circuit of the second logic counter means to provide said predetermined logic relationship.

4. A digital line synchronizer system for use with a communication switching network useful for switching a synchronized digital PCM pulse data train having a plurality of data samples arranged in a cyclic time frame format of repeating frame periods and including sporadically occurring bi-directional phase misalignments due to line variation phenomena, said switching network including system address timing signals of channel and digit occurrences in addition to receive channel and digit occurrences of said PCM pulse train, said line synchronizer system comprising: write address circuit means receiving thereto said PCM data samples in serial presentation, an input recovered clock pulse, loss of framing data, receive digit eight and receive channel one signals, said write address circuit means including storage means for separably storing said PCM data samples, first logic means for providing a WRITE WINDOW time span and a WRITE command during said WRITE WINDOW time span upon receipt of said receive digit eight signal, and second logic means for providing a write address during said WRITE WINDOW including counting means for counting write channels upon each combined receipt of said receive digit eight and receive channel one signals, off-set control circuit means receiving thereto said write address of said second logic means and said system address of said network and including comparison circuit means for comparing said write address and said system address, said comparison circuit providing a first output signal in response to the condition of said write address and said system address being equal, third logic means for said off-set control circuit providing a plurality of WRITE frame signals and being responsive to the sequential receipt of said WRITE command to provide selected ones thereof, fourth logic means for said off-set control circuit providing a plurality of READ frame signals and being responsive to the sequential receipt of a predetermined system timing signal to provide selected ones of said READ frame signals, and logic selection means connected to said third and fourth logic means and responsive to the receipt of either loss of framing or said first output signal of said comparison circuit means to set the logic state for said third logic means to a predetermined logic state with respect to the logic state for said fourth logic means so as to provide a preselected WRITE frame signal, input buffer memory means having a plurality of memory storage means, each thereof connected to receive thereto and to provide therefrom said PCM data samples and each having storage memories for n number of channels of PCM data where there are n channels comprising a frame period, and address gating logic means connected to receive preselected ones of said system digit signals, said system address, said write address and said WRITE and READ frame signals and being responsive thereto to select either reading the stored PCM data from a predetermined one of n number of storage memories of a preselected one of said memory storage means or writing incoming PCM data into a predetermined one of n number of storage memories of a preselected one of said memory storage means, said address gating logic means including fifth logic means receiving said preselected ones of said system digit signals to provide a READ time span within which a READ command occurs.

5. A digital line synchronizer system as claimed in claim 4 wherein said storage means of said write address circuit means is comprised of shift register means receiving successively thereto the eight digits of a selected serially presented PCM data sample and storage register means receiving in parallel form from said shift register the eight digits of an immediately preceding PCM data sample, said write address circuit means further including means for enabling the release of said parallel stored PCM data sample from said storage register upon receipt of said receive digit eight signal and the parallel transfer of said selected PCM data sample upon the serial receipt of the eighth digit thereof, and said first logic means being firstly activated by the receipt of a selected one of the digit occurrences of said system timing signals to comprise the start of said WRITE WINDOW and being secondly activated by the receipt of said receive digit eight signal occurring subsequent to said first activation, said first logic means responsive to said first and second logic activation to provide said WRITE command output signal with the occurrence of said second logic activation prior to the receipt by said first logic means of another selected one of the digit occurrences of said system timing signals comprising the finish of said WRITE WINDOW.

6. A digital line synchronizer system as claimed in claim 5 wherein said fifth logic means is firstly activated by the receipt of still another selected one of the digit occurrences of said system timing signals to comprise the start of said READ time span, said fifth logic means providing said READ command prior to the receipt of yet another selected one of the digit occurrences of said system timing signals comprising the finish of said READ time span.

7. A digital line synchronizer system as claimed in claim 4 wherein said comparison circuit means also receives thereto the logic states of said third and fourth logic means for comparing the same, said first output signal being provided in response to the condition of said logic states being equal in addition to said write address and said system address being equal, said logic states of said third and fourth logic means comprising frame select signals for inicating the selected WRITE frame signal and the selected READ frame signal being provided, respectively, said WRITE frame signals and said READ frame signals, respectively, being equal in number to the plurality of memory storage means and the number of write addresses and system addresses, respectively, being equal in number to $n$ number of storage memories of each memory storage means.

8. A digital line synchronizer for use with a synchronized pulse code modulated switching network having a plurality of connecting bidirectional signal lines, each carrying a PCM pulse data train comprised of a plurality of coded signals arranged in a first cyclic time frame format of repeating channel and frame periods and being switched through said network in time reference to a second cyclic time frame format of repeating channel and frame periods, said digital line synchronizer comprising write address means connected to one of said signal lines and including register means receiving thereto serially arranged coded signals of said first time frame format and providing therefrom said coded signals in a parallel arrangement, first logic means for providing a first time span and a first command during said first time span upon the occurrence of each completed channel period of said first frame format, said first time span occurring during a preselected portion of each channel period of said second frame format, counting means initiated by each repeating frame period of said first frame format and incremented thereafter with each completed channel period thereof, the count states of said counting means comprising first channel addresses and the occurrence of each count state comprising a first incrementing signal, off-set control means including first logic counter means triggered by said first incrementing signals, respectively, to provide a number of first logic states, first decoder means responsive to said first logic states to provide a corresponding number of first frame signals therefrom, second logic counter means triggered by the occurrence of preselected channel periods of said second frame format, respectively, to provide a number of second logic states, second decoder means responsive to said second logic states to providee a corresponding number of second frame signals therefrom, logic comparison means receiving preselected logic states from said first and said second logic counter means for comparing the logic states thereof for a first condition of equivalence, and receiving said first channel addresses together with the channel identifications of said second frame format comprising second channel addresses for comparing said first and said second channel addresses for a second condition of equivalence, first gating means responsive to either a loss of framing synchronization for said first frame format or to said first and second conditions of equivalence to reset said first logic states of said first logic counter means to a predetermined logic relationship with respect to said second logic states of said second logic counter means whereby the first frame signal from said first decoder means is selectively altered, address gating logic means including means for generating a second command signal during another preselected portion of each channel period of said second frame format and third decoder means receiving said first and said second frame signals and said first and said second channel addresses for alternate selection thereof, respectively, and input buffer memory means including a plurality of separate memory frames equal to the number of first frame signals and second frame signals, respectively, each memory frame having a plurality of memory storage means equal to the number of channel periods of said first and second frame formats, respectively, and further receiving thereto said parallel coded signals from said registered means and storing the same upon receipt of said first command signals from said generating means therefor, and providing said coded signals as PCM data outputs therefrom upon receipt of said second command signals, said first or said second frame signals being effective to select said memory frame and said first or said second channel addresses being effective to select said memory storage means within said memory frame.

* * * * *